(12) United States Patent
Kim et al.

(10) Patent No.: US 11,238,453 B2
(45) Date of Patent: Feb. 1, 2022

(54) DEVICE FOR PERFORMING SECURITY LOGIN SERVICE AND METHOD

(71) Applicant: Samsung Electronics Co., Ltd, Gyeonggi-do (KR)

(72) Inventors: Kyung Dong Kim, Gyeonggi-do (KR); Shin Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 15/494,179

(22) Filed: Apr. 21, 2017

(65) Prior Publication Data

US 2017/0308901 A1  Oct. 26, 2017

(30) Foreign Application Priority Data

Apr. 21, 2016 (KR) .................. 10-2016-0048660

(51) Int. Cl.
*G06Q 20/40* (2012.01)
*G06F 21/41* (2013.01)
*H04L 29/06* (2006.01)

(52) U.S. Cl.
CPC ....... *G06Q 20/40145* (2013.01); *G06F 21/41* (2013.01); *H04L 63/0815* (2013.01)

(58) Field of Classification Search
CPC .............. G06Q 20/40145; G06F 21/41; H04L 63/0815
USPC .......................................................... 705/50
See application file for complete search history.

(56) References Cited

U.S. PATENT DOCUMENTS

| 2014/0143145 A1* | 5/2014 | Kortina | G06Q 20/401 705/44 |
| 2014/0258135 A1* | 9/2014 | Park | G06Q 20/382 705/75 |
| 2015/0312256 A1* | 10/2015 | Seibert, Jr. | H04L 63/102 726/8 |
| 2016/0269396 A1* | 9/2016 | Ren | H04W 12/0602 |

FOREIGN PATENT DOCUMENTS

| KR | 20020009108 A | 2/2002 | |
| WO | WO-2016044882 A1 * | 3/2016 | ............. G06Q 20/12 |

OTHER PUBLICATIONS

"Login with Amazon Developer Guide for Websites," Dec. 16, 2015, retrieved from Internet: https://web.archive.org/web/20160414102628/https://images-na.ssl-images-amazon.com/images/G/01/1wa/dev/docs/website-developer-guide._TTH.pdf, retrieved Jun. 1, 2017, XP055377922, 44 pages. (Year: 2015).*

(Continued)

*Primary Examiner* — Patrick McAtee
*Assistant Examiner* — Zesheng Xiao

(57) ABSTRACT

A method for performing a security login in an electronic device includes accessing, by an electronic device including a communication circuit and a processor, a web page. The method also includes receiving a user input for requesting a login to the web page and receiving first information for the login from the web page. The received first information is transmitted to a payment service provider server and a request for second information for authentication is received from the payment service provider server. The requested second information is transmitted to the payment service provider server and the login to the web page is performed.

16 Claims, 10 Drawing Sheets

(56) References Cited

OTHER PUBLICATIONS

"Login and Pay with Amazon Integration Guide," Feb. 27, 2015, retrieved from Internet: https://images-na.ssl-images-amazon.com/images/G/01/mwsportal/doc/en_US/offamazonpayments/LoginAndPayWithAmazonIntegrationGuide.pdf, retrieved Jun. 2, 2017, XP055378203, 104 pages.
"Login with Amazon Developer Guide for Websites," Dec. 16, 2015, retrieved from Internet: https://web.archive.org/web/20160414102628/https://images-na.ssl-images-amazon.com/images/G/01/1wa/dev/docs/website-developer-guide._TTH.pdf, retrieved Jun. 1, 2017, XP055377922, 44 pages.
Lexy Savvides, "Samsung Pay: What you need to know (FAQ)," CNET, Mar. 23, 2016, retrieved from Internet: https://www.cnet.com/news/samsung-pay-what-you-need-to-know-faq/, retrieved Jun. 1, 2017, XP055377954, 4 pages.
European Patent Office, "European Search Report," Application No. EP 17 16 7267, dated Jun. 13, 2017, 8 pages.

\* cited by examiner

DEVICE FOR PERFORMING SECURITY LOGIN SERVICE AND METHOD

CROSS-REFERENCE TO RELATED APPLICATION(S) AND CLAIM OF PRIORITY

The present application is related to and claims the benefit under 35 U.S.C. § 119(a) of a Korean patent application filed on Apr. 21, 2016 in the Korean Intellectual Property Office and assigned Serial number 10-2016-0048660, the entire disclosure of which is hereby incorporated by reference.

TECHNICAL FIELD

This disclosure relates to an electronic device, which performs a security login service, and a method thereof.

BACKGROUND

With developments of information and communication technology, network devices such as a base station and the like are installed throughout the country. The electronic device transmits or receives data to or from another electronic device over a network, and thus a user utilizes the network freely anywhere in the country.

Various kinds of electronic devices provide a variety of functions in accordance with the recent trend of the digital convergence. For example, a smartphone supports an Internet connection function through the network as well as a call function. Furthermore, the smartphone supports the following: a function of playing music or video, a function of capturing video, photo, and the like using an image sensor, and the like.

In addition, the various types of the electronic devices store card information, which allows the electronic devices to make payment online or offline.

A conventional login service that stores user identifications (IDs) and passwords associated with a plurality of web pages needs a separate user ID and password for the login service. In this case, when the login service is hacked, information about the separate user ID and password for the login service may be leaked.

Alternatively, whenever the user utilizes the login service, the user may enter a resident registration number, credit card information, OTP information, transportation card information, or the like as information for user's own authentication instead of the separate user ID and password for the login service.

SUMMARY

To address the above-discussed deficiencies, it is a primary object to provide an electronic device, which performs a security login service by using a payment means and authentication information, which are stored in the electronic device in advance, for a security login service and a method thereof.

In accordance with an aspect of this disclosure, a method includes accessing, by an electronic device including a communication circuit and a processor, a web page, receiving a user input for requesting a login to the web page, receiving first information for the login from the web page, transmitting the received first information to a payment service provider server, receiving a request for second information for authentication from the payment service provider server, transmitting the requested second information to the payment service provider server, and performing the login to the web page.

In accordance with an aspect of this disclosure, an electronic device includes a communication circuit, a display circuit, a user input circuit, and a processor electrically connected with the communication circuit, the display circuit, and the user input circuit. The processor is configured to access a web page through the communication circuit, to display the web page in a screen through the display circuit, to receive a user input for requesting a login to the web page through the user input circuit, to receive first information for the login from the web page through the communication circuit, to transmit the received first information to a payment service provider server, to receive a request for second information for authentication from the payment service provider server, to transmit the requested second information to the payment service provider server, and to perform the login to the web page.

Other aspects, advantages, and salient features of the disclosure will become apparent to those skilled in the art from the following detailed description, which, taken in conjunction with the annexed drawings, discloses various embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
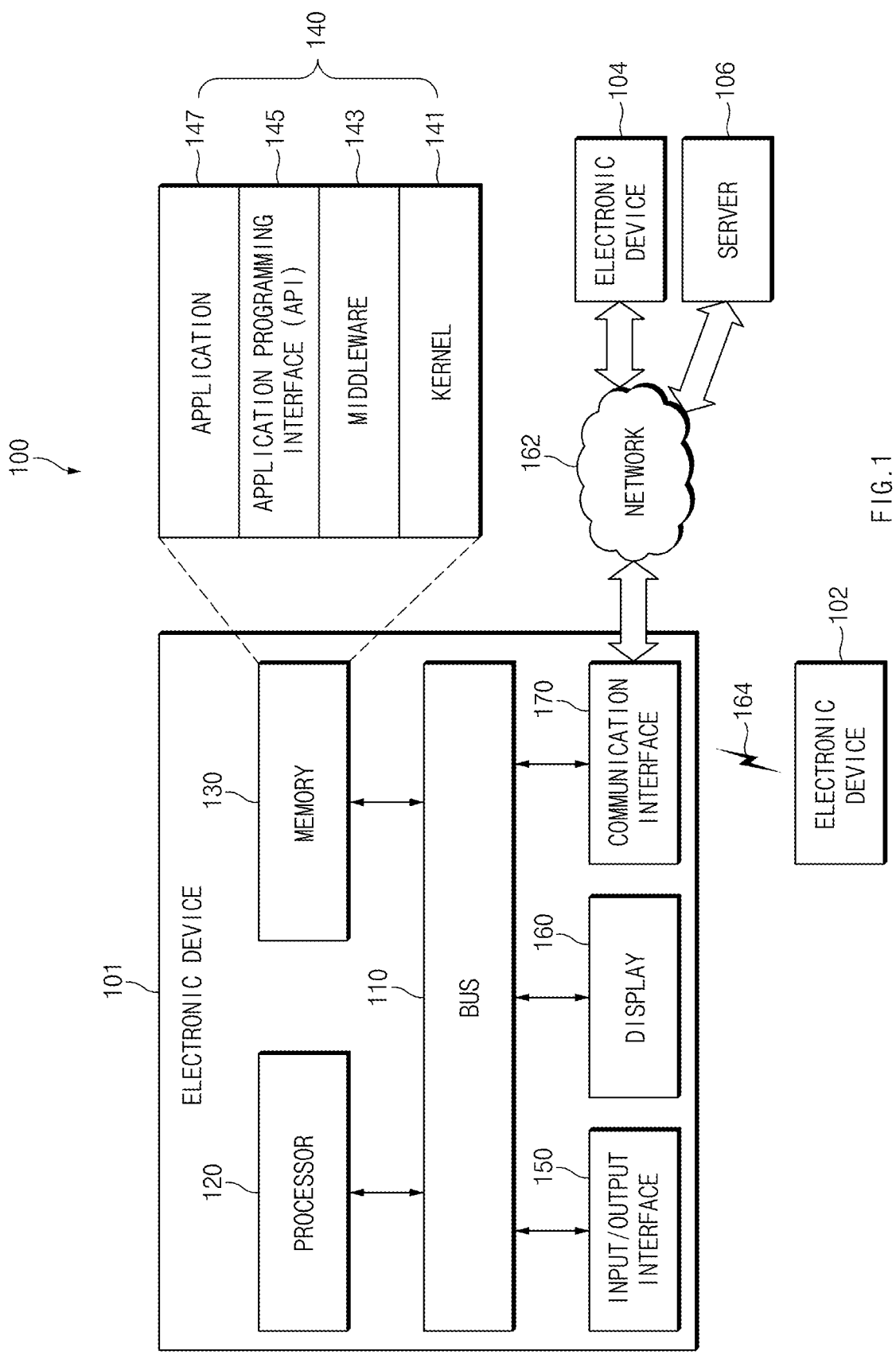
FIG. 1 illustrates an electronic device in a network environment, according to various embodiments of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of this disclosure may be described with reference to accompanying drawings. Accordingly, those of ordinary skill in the art will recognize that modification, equivalent, and/or alternative on the various embodiments described herein can be variously made without departing from the scope and spirit of this disclosure. With regard to description of drawings, similar elements may be marked by similar reference numerals.

In this disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of this disclosure, but do not limit the elements. For example, "a first user device" and "a second user device" indicate different user devices regardless of the order or priority. For example, "a first user device" and "a second user device" indicate different user devices. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of this disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of this disclosure. In some cases, even if terms are terms which are defined in the specification, they may not be interpreted to exclude embodiments of this disclosure.

For example, an electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., SAMSUNG HOMESYNC™, APPLE or GOOGLE TV®), game consoles (e.g., XBOX® or PLAYSTATION®), electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

In the accompanying drawings below, a smartphone will be exemplified as an electronic device according to an embodiment of this disclosure, FIG. 1 illustrates electronic devices in a network environment 100, according to various embodiments.

Referring to FIG. 1, according to various embodiments, an electronic device 101, a first electronic device 102, a second electronic device 104, or a server 106 may be connected with each other over a network 162 or a local area network 164. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). The processor 120 may perform, for example, data processing or an operation associated with control or communication of at least one other element(s) of the electronic device 101.

The memory 130 may include a volatile and/or nonvolatile memory. For example, the memory 130 may store instructions or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or an application) 147. At least a part of the kernel 141, the middleware 143, or the API 145 may be referred to as an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other element(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

The communication interface 170 may establish communication between the electronic device 101 and an external electronic device (e.g., the first electronic device 102, the second electronic device 104, or the server 106). For example, the communication interface 170 may be connected to a network 162 through wireless communication or wired communication to communicate with an external device (e.g., the second electronic device 104 or the server 106).

The wireless communication may be a cellular communication protocol and may include cellular communication that uses, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like. According to an embodiment, the wireless communication may include at least one of, for example, WI-FI®, BLUETOOTH®, Bluetooth low energy (BLE), ZIGBEE®, near field communication (NFC), magnetic secure transmission (MST), radio frequency (RF), or a body area network (BAN). According to an embodiment, the wireless communication may include a global navigation satellite system (GNSS). The GNSS may be a global positioning system (GPS), a global navigation satellite system (GLONASS), a Beidou Navigation Satellite System (hereinafter referred to as "BEIDOU"), or an European global satellite-based navigation system (GALILEO). Hereinafter, in this disclosure, "GPS" and "GNSS" may be used interchangeably.

The MST may generate a pulse based on transmission data by using an electromagnetic signal, and the pulse may generate a magnetic field signal. The electronic device 101 may transmit the magnetic field signal to point of sale (POS). The POS may detect the magnetic field signal using a MST reader and may recover the data by converting the detected magnetic field signal to an electrical signal.

The GNSS may include at least one of a GPS, a GLONASS, a BEIDOU, or a GALILEO based on an available area or a bandwidth, and the like. Hereinafter, "GPS" and "GNSS" may be used interchangeably in this disclosure. The wired communication may include at least one of, for example, a universal serial bus (USB), a high definition multimedia interface (HDMI), a recommended standard 232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a server or a group of two or more servers. According to various embodiments, all or a part of operations that the electronic device 101 may be executed by another or plural electronic devices (e.g., the first electronic devices 102, the second electronic device 104, or the server 106). According to an embodiment, in the case where the electronic device 101 executes any function or service automatically or in response to a request, the electronic device 101 may not perform the function or the service internally, but, alternatively additionally, it may request at least a part of a function associated with the electronic device 1101 from any other electronic device (e.g., the first electronic device 102, the second electronic device 104, or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
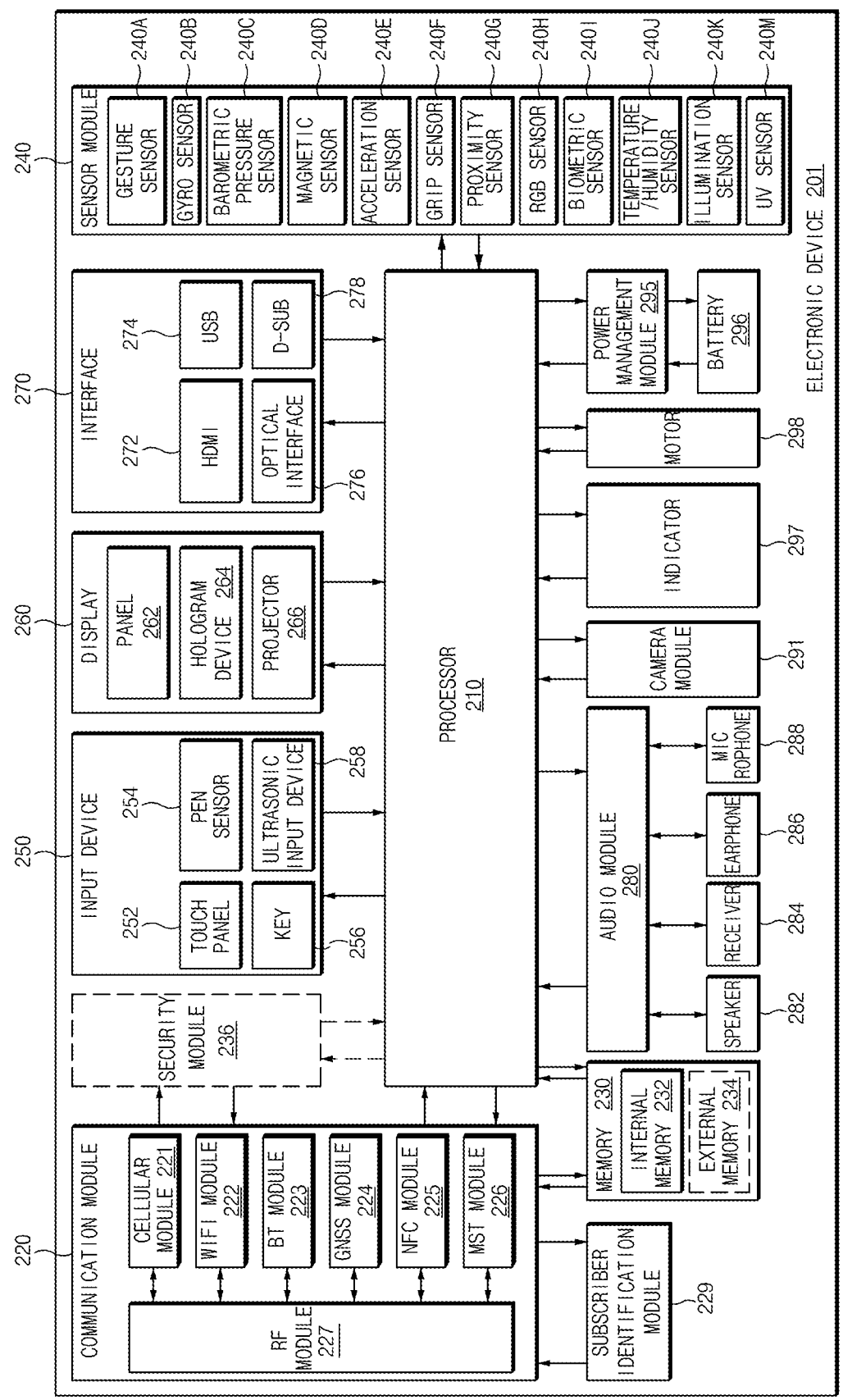
FIG. 2 illustrates an electronic device according to various embodiments of this disclosure.

FIG. 2 illustrates a block diagram of an electronic device according to various embodiments.

Referring to FIG. 2, the electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive an operating system (OS) or an application program to control a plurality of hardware or software elements connected to the processor 210 and may process and compute a variety of data. For example, the processor 210 may be implemented with a system on chip (SoC). According to an embodiment, the processor 210 may further include a graphic processing unit (GPU) and/or an image signal processor (ISP). The processor 210 may include at least a part (e.g., a cellular module 221) of elements illustrated in FIG. 2. The processor 210 may load and process an instruction or data, which is received from at least one of other elements (e.g., a nonvolatile memory) and may store a variety of data in a nonvolatile memory.

The communication module 220 may be configured the same as or similar to the communication interface 170 of FIG. 1. The communication module 220 may include a cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide a voice call, a video call, a character service, an Internet service, or the like over a communication network. According to an embodiment, the cellular module 221 may perform discrimination and authentication of the electronic device 201 within a communication network by using the subscriber identification module 229 (e.g., a SIM card). According to an embodiment, the cellular module 221 may perform at least a part of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor that processes data exchanged through a corresponding module, for example. According to an embodiment, at least a part (e.g., two or more elements) of the cellular module 221, the Wi-Fi module 222, the BT module 223, the GNSS module 224, the NFC module 225, or the MST module 226 may be included within one Integrated Circuit (IC) or an IC package.

The RF module 227 may transmit and receive, for example, a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM which includes a subscriber identification module and may include unique identification information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected with the electronic device 201 through various interfaces.

The security module 236 may be a module that includes a storage space of which the security level is higher than that of the memory 230. The security module 236 may guarantee safe data storage and a protected execution environment. The security module 236 may be implemented with a separate circuit and may include a separate processor. For example, the security module 236 may be in a smart chip or a secure digital (SD) card, which is detachable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on Java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of, for example, a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, or an ultra violet (UV) sensor 240M. Additionally or generally, the sensor module 240 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit that controls at least one or more sensors included therein. According to an embodiment, the electronic device 201 may further include a processor which is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be configured the same as or similar to the display 160 of FIG. 1. The panel 262 may be implemented to be flexible, transparent or wearable, for example. The panel 262 and the touch panel 252 may be integrated into a single module. According to an embodiment, the panel 262 may include a pressure sensor (or a "force sensor" interchangeably used hereafter) that is capable of measuring the intensity of pressure on the touch of a user. The pressure sensor may be implemented with a combination with the touch panel 252 or may be implemented with one or more sensors that are independent of the touch panel 252. The hologram device 264 may display a stereoscopic image in a space by using a light interference phenomenon. The projector 266 may project light onto a screen so as to display an image. The screen may be arranged inside or outside the electronic device 201. According to an embodiment, the display 260 may further include a control circuit that controls the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the I/O interface 150 illustrated in FIG. 1. The audio module 280 may process, for example, sound information that is input or output through a speaker 282, a receiver 284, an earphone 286, or a microphone 288.

The camera module 291 that shoots a still image or a video may include, for example, at least one image sensor (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC) a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device that supports a mobile TV may process media data according to the standards of digital multimedia broadcasting (DMB), digital video broadcasting (DVB), MediaFlo™, or the like.

Each of the above-mentioned elements of the electronic device described in this disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
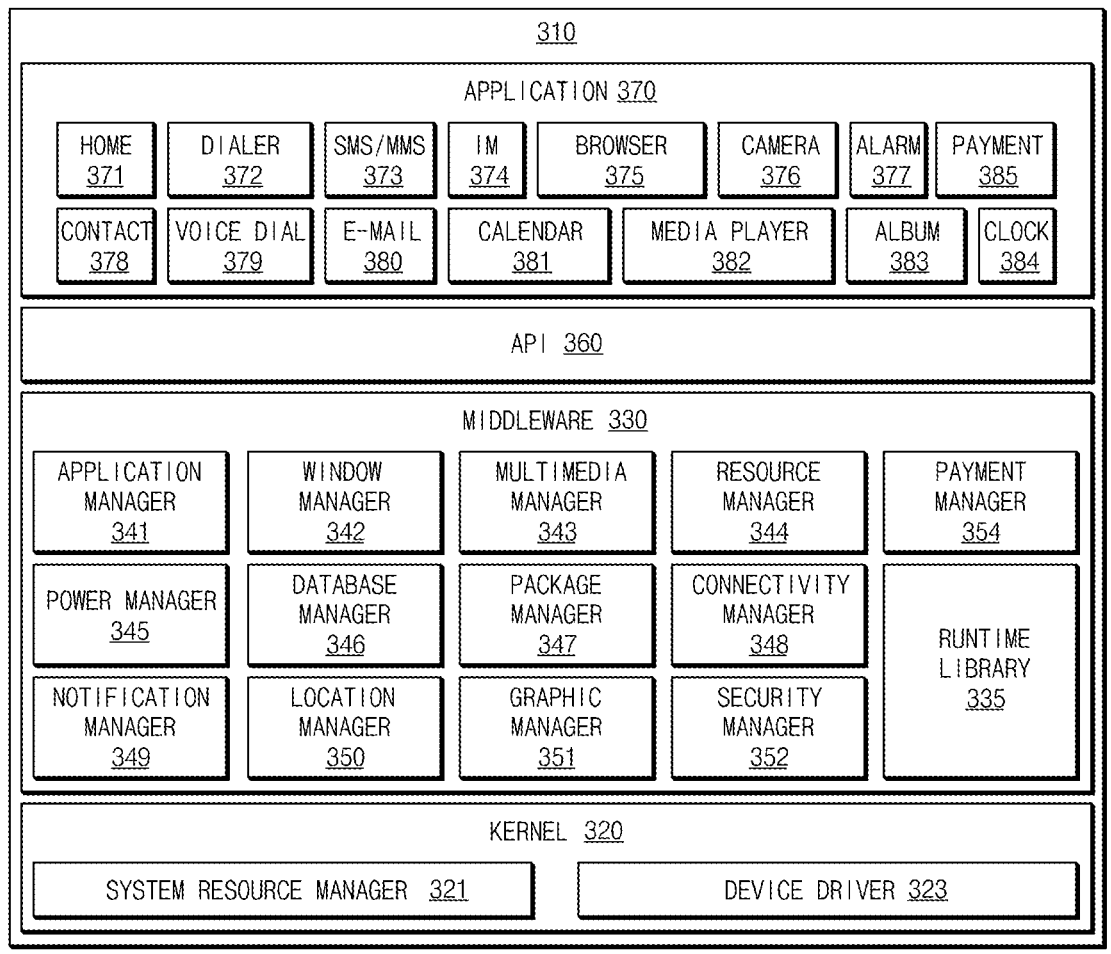
FIG. 3 illustrates a program module according to various embodiments of this disclosure.

According to an embodiment, a program module 310 (e.g., the program 140), as illustrated in FIG. 3, may include an operating system (OS) to control resources associated with an electronic device (e.g., the electronic device 101), and/or diverse applications (e.g., the application program 147) driven on the OS. The OS may be, for example, ANDROID®, iOS®, WINDOWS®, SYMBIAN™, TIZEN®, SAMSUNG BADA®, or the like.

The program module 310 may include a kernel 320, a middleware 330, an application programming interface (API) 360, and/or an application 370. At least a part of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321, or a device driver 323. The system resource manager 321 may control, allocate, or retrieve system resources. According to an embodiment, the system resource manager 321 may include a process managing part, a memory managing part, a file system managing part, or the like. The device driver 323 may include, for example, a display driver, a camera driver, a Bluetooth driver, a common memory driver, an USB driver, a keypad driver, a Wi-Fi driver, an audio driver, or an inter-process communication (IPC) driver.

The middleware 330 may provide, for example, a function which the application 370 needs in common or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module which is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource which is used in a screen. The multimedia manager 343 may identify a format necessary for playing diverse media files, and may perform encoding or decoding of media files by using a codec suitable for the format. The resource manager 344 may manage resources such as a storage space, a memory, or a source code of at least one application of the application 370.

The power manager 345 may operate, for example, with a basic input/output system (BIOS) to manage a battery or power, and may provide power information for an operation of an electronic device. The database manager 346 may generate, search for, or modify database which is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information of an electronic device. The graphic manager 351 may manage a graphic effect that is provided to a user, or manage a user interface relevant thereto. The security manager 352 may provide a general security function necessary for system security, user authentication, or the like. According to an embodiment of this disclosure, in the case where an electronic device (e.g., the electronic device 101) includes a telephony function, the middleware 330 may further includes a telephony manager for managing a voice or video call function of the electronic device.

The middleware 330 may include a middleware module that combines diverse functions of the above-described elements. The middleware 330 may provide a module specialized to each OS kind to provide differentiated functions. In addition, the middleware 330 may remove a part of the preexisting elements, dynamically, or may add new elements thereto.

The API 360 (e.g., an API 145) may be, for example, a set of programming functions and may be provided with a configuration which is variable depending on an OS. For example, in the case where an OS is ANDROID® or iOS®, it may provide one API set per platform. In the case where an OS is TIZEN®, it may provide two or more API sets per platform.

The application 370 (e.g., the application program 147) may include, for example, one or more applications capable of providing functions for a home 371, a dialer 372, a short message service (SMS)/multimedia messaging service (MMS) 373, an instant message (IM) 374, a browser 375, a camera 376, an alarm 377, a contact 378, a voice dial 379, an e-mail 380, a calendar 381, a media player 382, an album 383, a clock 384, and a payment 385 or for offering health care (e.g., measuring an exercise quantity or blood sugar) or environment information (e.g., information of barometric pressure, humidity, or temperature).

According to an embodiment, the application 370 may include an application (hereinafter referred to as "information exchanging application" for descriptive convenience) to support information exchange between the electronic device (e.g., the electronic device 101) and an external electronic device (e.g., the first electronic device 102 or the second electronic device 104). The information exchanging application may include, for example, a notification relay application for transmitting specific information to the external electronic device, or a device management application for managing the external electronic device.

For example, the information exchanging application may include a function of transmitting notification information, which is generated from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with an electronic device, an application running in the external electronic device, or a service (e.g., a call service, a message service, or the like) provided from the external electronic device.

According to an embodiment, the application 370 may include an application (e.g., a health care application of a mobile medical device) which is assigned in accordance with an attribute of the external electronic device. According to an embodiment, the application 370 may include an application received from an external electronic device (e.g., the first electronic device 102, the second electronic device 104, or the server 106). According to an embodiment of this disclosure, the application 370 may include a preloaded application or a third party application which is downloadable from a server. The titles of elements in the program module 310 according to the embodiment may be modifiable depending on kinds of operating systems.

According to various embodiments of this disclosure, at least a portion of the program module 310 may be implemented by software, firmware, hardware, or a combination of two or more thereof. At least a part of the program module 310 may be implemented (e.g., executed), for example, by a processor (e.g., the processor 210). At least a portion of the program module 310 may include, for example, modules, programs, routines, sets of instructions, processes, or the like, for performing one or more functions.

Figure 4A:
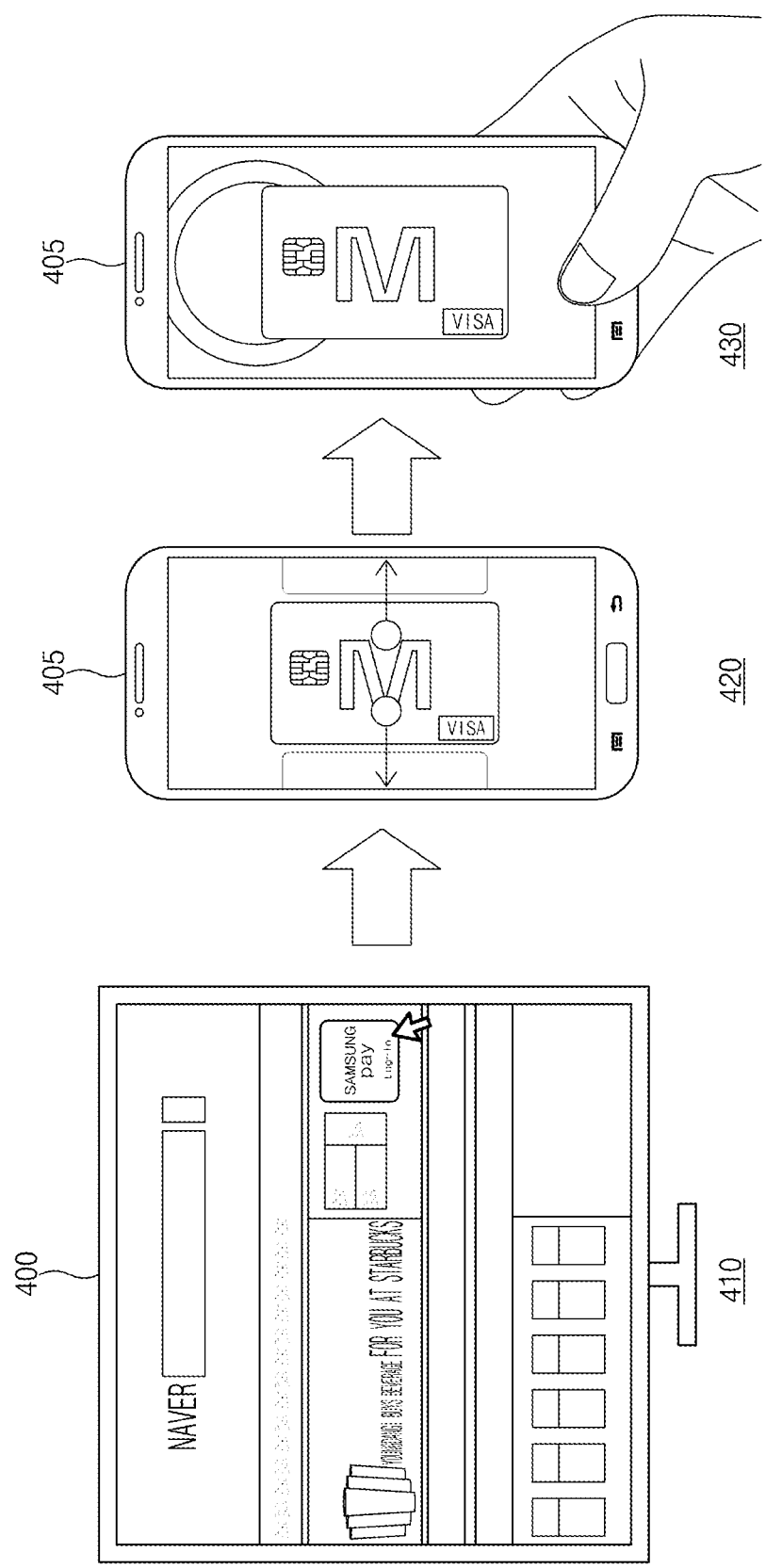
FIG. 4A illustrates an operation of performing a security login service, according to various embodiments of this disclosure.

FIG. 4A illustrates an operation of performing a security login service, according to various embodiments of this disclosure.

Referring to FIG. 4A, the operation of performing the security login service may be executed through operation 410 to operation 430 by using a computer device 400 and an electronic device 405. According to various embodiments of this disclosure, it is described that the computer device 400 is a desk-top and the electronic device 405 is a smartphone.

In operation 410, the computer device 400 may display a web page (e.g., naver.com) in a display. In this case, the computer device 400 may receive a user input for selecting the security login service in the web page from a user. The user input for selecting the security login service may include a click, a touch input, a hover input, or any other activation operation to an icon for activating the security login service.

In operation 420, the electronic device 405 may execute an application that performs the security login service based on the user input received in operation 410. For example, a web-server (a web-server associated with the web page) operating the web page may request the electronic device 405 to execute the application that performs the security login service based on the user input (first information for a login) received in operation 410. According to various embodiments of this disclosure, the application that performs the security login service may include, for example, a security payment application (e.g., Samsung Pay™). In other words, the security login service may be performed by using the security payment application that is installed in the electronic device 405 in advance.

In addition, in operation 420, the electronic device 405 may receive a user input for selecting one of a plurality of payment means that is registered in the performed security payment application. For example, the payment means may be a credit card that is capable of being used to make a payment in an online or offline transaction. According to various embodiments of this disclosure, the plurality of payment means may be matched with user information stored in a payment service provider server, a card issuer server, or a network operator (NO) server (the detailed descriptions will be described with reference to FIG. 5).

In operation 430, the electronic device 405 may enter authentication information (second information for user authentication) about the payment means selected in operation 420. The authentication information may include, for example, a password or biometric information (e.g., iris information, fingerprint information, or the like). According to the authentication information, the web-server may perform a login based on the user input received in operation 410.

Figure 4B:
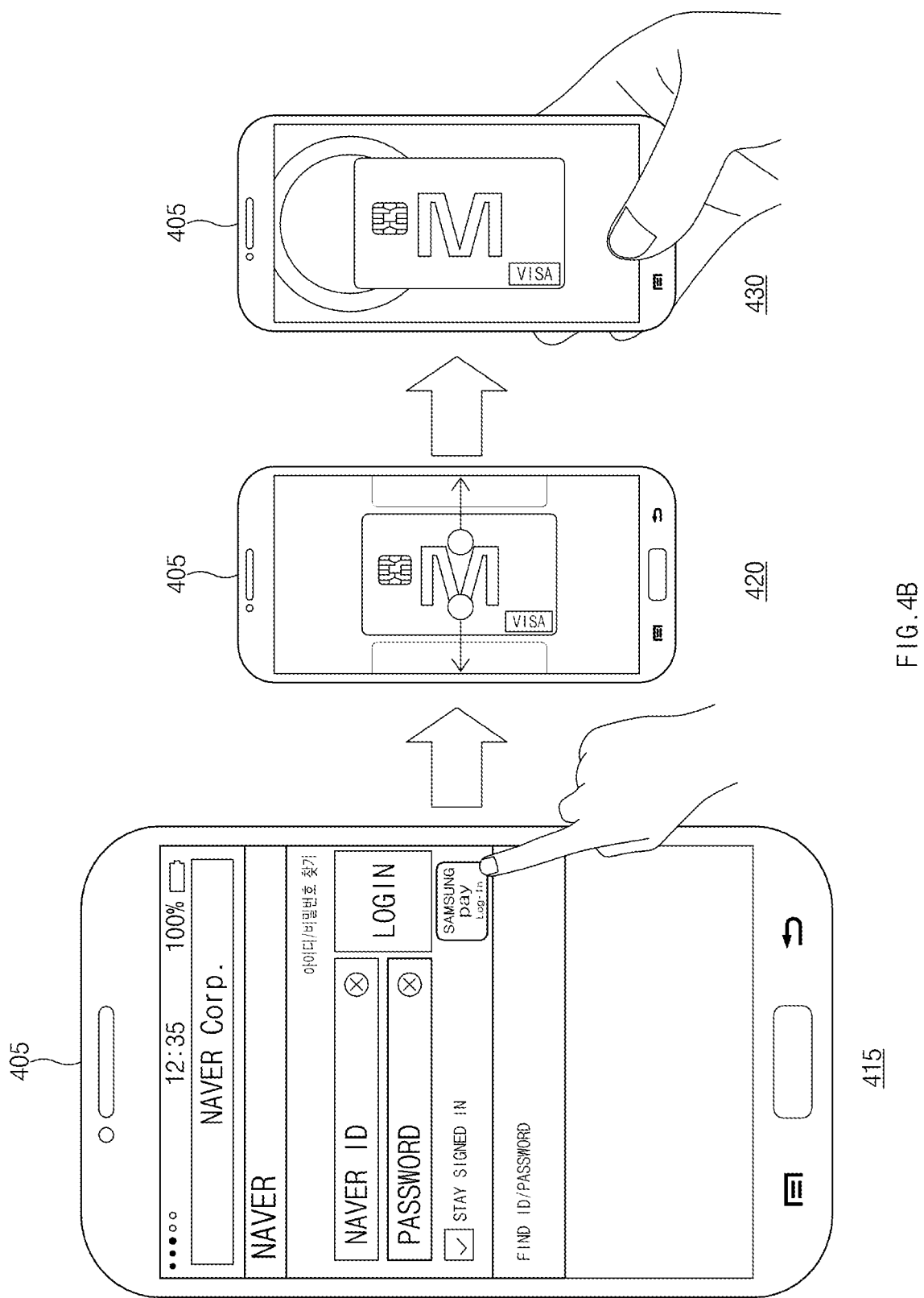
FIG. 4B illustrates an operation of performing a security login service, according to various embodiments of this disclosure.

FIG. 4B illustrates an operation of performing a security login service, according to various embodiments of this disclosure.

Referring to FIG. 4B, the operation of performing the security login service may be executed through operation 415 to operation 430 by using the electronic device 405. According to various embodiments of this disclosure, it is described that the electronic device 405 is a smartphone.

In operation 415, the electronic device 405 may display a web page (e.g., naver.com) in a display. In this case, the electronic device 405 may receive a user input for selecting the security login service in the web page from a user. The user input for selecting the security login service may include a click, a touch input, a hover input, or any other activation operation to an icon for activating the security login service.

In operation 420, the electronic device 405 may execute an application that performs the security login service based on the user input received in operation 415. For example, a web-server operating the web page may request the electronic device 405 to execute the application that performs the security login service based on the user input (e.g., first information for a login) received in operation 415. According to various embodiments of this disclosure, the application that performs the security login service may include, for example, a security payment application (e.g., Samsung Pay™). In other words, the security login service may be performed by using the security payment application that is installed in the electronic device 405 in advance.

In addition, in operation 420, the electronic device 405 may receive a user input for selecting one of a plurality of payment means that is registered in the performed security payment application. For example, the payment means may be a credit card that is capable of being used to make a payment in an online or offline transaction. According to various embodiments of this disclosure, the plurality of payment means may be matched with user information and the matched plurality of payment means may be stored in a payment service provider server, a card issuer server, and a NO server, and the like (the detailed descriptions will be described with reference to FIG. 5).

In operation 430, the electronic device 405 may enter authentication information (second information) about the payment means selected in operation 420. The authentication information may include, for example, a password or biometric information (e.g., iris information, fingerprint information, or the like). According to the authentication information, the web-server may perform a login based on the user input received in operation 415.

Figure 5:
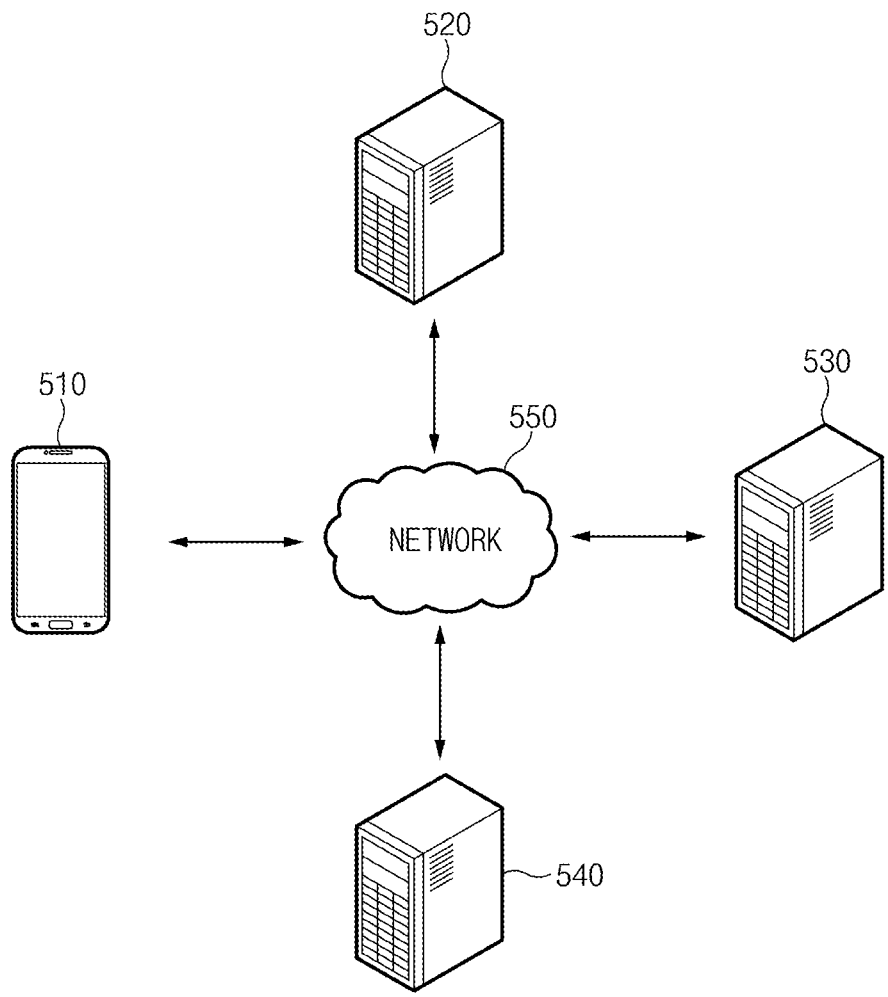
FIG. 5 illustrates an environment for performing a security login service, according to various embodiments of this disclosure.

FIG. 5 illustrates an environment for performing a security login service, according to various embodiments of this disclosure.

Referring to FIG. 5, the environment for performing the security login service may include an electronic device 510, a payment service provider server 520, a card issuer server 530, a web-server 540, and a network 550. The security login service may be performed through a security payment application (e.g., SAMSUNG PAY™) installed in the electronic device 510.

According to various embodiments of this disclosure, the network 550 may connect at least two or more of the electronic device 510, the payment service provider server 520, the card issuer server 530, and the web-server 540 with each other. Herein, since the environment for performing the security login service exemplifies one of various embodiments of this disclosure, this disclosure is not limited thereto through FIG. 5.

According to various embodiments, the electronic device 510 (e.g., the processor 210) may request registration from the payment service provider server 520 to use the security login service, and thus, the electronic device 510 may perform the registration. In this case, the electronic device 510 may register the payment means to be used for the security login in the payment service provider server 520. Furthermore, the payment application of the electronic device 510 may register at least one payment means depending on the domain of a web page. The payment application may match and register payment means that are different from or the same as each other based on the domain. Hereinafter, the registration process of the security login service will be described.

The electronic device 510 (e.g., the communication module 220) may transmit a subscription request for the security login service to the payment service provider server 520. The subscription request for the security login service may include, for example, a web page (a site (e.g., naver.com)), to which the security login service is provided, and user account information (e.g., an ID and a password) of the web page.

The payment service provider server 520 may check a subscription history of a user of the electronic device 510. In the case where there is no subscription history, the payment service provider server 520 may request the web-server 540 operating the web page to verify the user account information.

The web-server 540 may receive the request for verifying the user account information and may transmit the verification result of the user account information to the payment service provider server 520.

The payment service provider server 520 may verify the validity of the user account information to request the payment means and authentication information (e.g., a password, personal identification number (pin) information, or biometric information) from the electronic device 510.

The electronic device 510 may provide a screen for requesting the payment means and the authentication information from the user, through a display. The electronic device 510 may receive the payment means and the authentication information from the user. Also, the electronic device 510 may transmit the received payment means and the requested authentication information to the payment service provider server 520.

The payment service provider server 520 may match information of the electronic device 510, the selected payment means information, web page information, and user account information with each other and may store the matched result.

The payment service provider server 520 may request authentication from the card issuer server 530. According to various embodiments of this disclosure, card issuers may operate different servers from each other, respectively. The card issuer server 530 may be a server that a card issuer corresponding to the selected payment means operates. For example, in the case where the user selects a samsung credit card as a payment means, the payment service provider server 520 may request the authentication from the server of the samsung credit card. The authentication request may include the payment means information and the authentication information.

The card issuer server 530 may perform the authentication through the payment means information and the authentication information. In addition, the card issuer server 530 may transmit the authentication result to the payment service provider server 520. According to various embodiments of this disclosure, the card issuer server 530 may match the information of the electronic device 510, the selected payment means information, the web page information, the user account information, and the authentication information with each other and may store the matched result.

The payment service provider server 520 may register the user of the electronic device 510 in the security login service based on the authentication result of the card issuer server 530. In addition, the payment service provider server 520 may provide the registration result associated with the security login service of a user of the electronic device 510 to the electronic device 510 and the web-server 540.

The web-server 540 may store the received registration result. The electronic device 510 may provide the user with the received registration result through the display.

Above, the registration process of the security login service is described. The process of performing the security login service will be described below.

The web page may receive the security login request. The security login may be requested in response to a user input received from the user.

The web page may request transaction information from the web-server 540. The web-server 540 may generate the transaction information as the response of the received request. The web-server 540 may transmit the generated transaction information to the web page.

The web page may transmit the login request to the electronic device 510. The login request transmitted to the electronic device 510 may include the received transaction information.

The electronic device 510 (e.g., a samsung pay application) may request the login from the payment service provider server 520. The login request that is transmitted to the payment service provider server 520 may include an address of the web page and the transaction information.

The payment service provider server 520 may determine whether the user of the electronic device 510 subscribes the security login service of the web page. In the case where there is a history in which the security login service is subscribed in advance, the payment service provider server 520 may request authentication information (second information for authentication) from the electronic device 510.

The electronic device 510 may receive the authentication information from the user. The authentication information may be, for example, biometric information such as a fingerprint, an iris, or the like and may be a password or the like that the user assigns in advance. The electronic device 510 may transmit the received authentication information to the payment service provider server 520.

The payment service provider server 520 may transmit a login authentication request including the received authentication information to the card issuer server 530. The card issuer server 530 may compare authentication information, which is registered in the card issuer server 530 in advance, with authentication information received from the payment service provider server 520 to determine whether the authentication information received from the payment service provider server 520 is valid. If the authentication information is valid, the card issuer server 530 may generate security information (e.g., a one-time card number (OTC)). Afterwards, the card issuer server 530 may transmit the authentication result to the payment service provider server 520. The authentication result may include the security information and user account information corresponding to the web page.

The payment service provider server 520 may transmit the authentication result and the transaction information received from the card issuer server 530 to the web-server 540 and the electronic device 510.

The electronic device 510 may transmit the transaction information and the authentication result to the web page. The web page may request the login by transmitting the transaction information to the web-server 540.

The web-server 540 may determine whether the transaction information received from the web page is the same as transaction information generated by the web-server 540. In addition, the web-server 540 may allow the card issuer server 530 to verify the security information by transmitting the security information received from the payment service provider server 520 to the card issuer server 530. The card issuer server 530 may transmit the user account information to the payment service provider server 520.

The web-server 540 may perform the security login associated with the web page based on the received user account information.

According to various embodiments of this disclosure, each of the payment service provider server 520, the card issuer server 530, and the web-server 540 illustrated in FIG. 5 may be a single device and may be two or more devices. For example, the payment service provider server 520 may additionally have a server registering a service and a server performing the security login.

According to various embodiments, the network 550 may indicate a connection structure in which information exchange between nodes such as terminals and servers is possible. An example of the network may include an Internet, a wireless local area network (Wireless LAN), a wide area network (WAN), a personal area network (PAN), 3G, long term evolution (LTE), WI-FI®, world interoperability for microwave access (WiMAX), wireless gigabit (WI-GIG™), and the like. However, an embodiment of this disclosure is not limited thereto.

Figure 6:
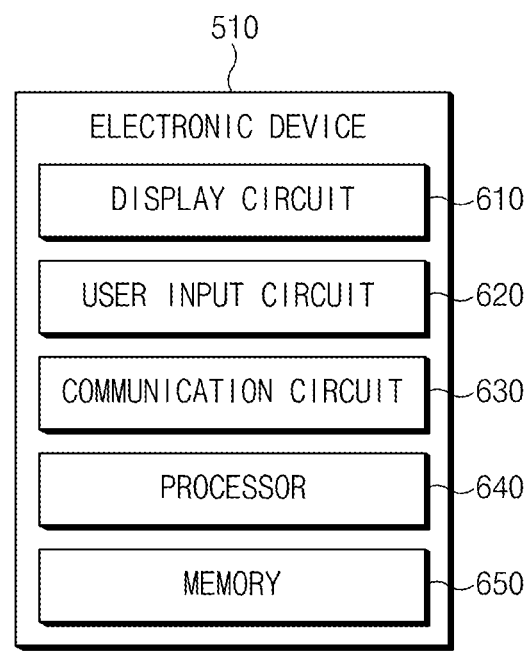
FIG. 6 illustrates an electronic device performing a security login service, according to an embodiment of this disclosure.

FIG. 6 illustrates an electronic device performing a security login service, according to an embodiment of this disclosure.

Referring to FIG. 6, the electronic device 510 may include a display circuit 610, a user input circuit 620, a communication circuit 630, a processor 640, and a memory 650. A configuration of the electronic device 510 illustrated in FIG. 5 may be only exemplary and may be variously changed or modified. For example, the electronic device 510 may further include a user interface for receiving any instruction or information from a user. In this case, the user interface may be an input device such as a keyboard, a mouse, or the like, but the user interface may also be a graphical user interface (GUI) to be displayed on a screen of the electronic device 510.

According to various embodiments of this disclosure, the display circuit 610 may display at least one content in a screen of the electronic device 510. The displayed content may include an image, a video, an application icon, an application execution screen, or the like.

An operation in which the display circuit 610 displays the content may be executed by the processor 640.

The user input circuit 620 may receive a user input that is entered from a user. The user input may include, for example, a touch input or a hover input through a finger of the user, a stylus (e.g., a touch pen), or the like.

The communication circuit 630 may transmit or receive data to or from the outside (e.g., the payment service provider server 520, the card issuer server 530, the web-server 540, or the like) through a network (e.g., the network 550 of FIG. 5).

The processor 640 may be implemented with, for example, a system on chip (SoC) and may include one or more of a central processing unit (CPU), a graphic processing unit (GPU), an image signal processor, an application processor (AP), and a communication processor (CP). The processor 640 may load an instruction or data, which is received from at least one of other elements (e.g., the display circuit 610, the user input circuit 620, and the communication circuit 630), from the memory 650, may process the instruction or the data, and may store various pieces of data in the memory 650.

The processor 640 may display a security login application in the screen of the electronic device 510 through the display circuit 610. The security login application may be displayed through the user input for selecting the application icon of the security login application.

The processor 640 may receive a user input (e.g., a touch input) for requesting the subscription of the security login service through the user input circuit 620.

The processor 640 may transmit the subscription request for the security login service to the payment service provider server 520 through the communication circuit 630. The subscription request for the security login service may include, for example, a web page (a site (e.g., naver.com)), to which the security login service is provided, and user account information (e.g., an ID and a password) of the web page.

The processor 640 may receive a request for payment means and authentication information (e.g., a password, pin information, or biometric information) from the payment service provider server 520 through the communication circuit 630.

The processor 640 may display a screen for requesting the payment means and the authentication information from the user through the display circuit 610, in a screen. The processor 640 may receive the payment means and the authentication information from the user through the user input circuit 620. Also, the processor 640 may transmit the received payment means and the received authentication information to the payment service provider server 520 through the communication circuit 630.

The processor 640 may receive the registration result associated with the security login service of the user of the electronic device 510 from the payment service provider server 520 through the communication circuit 630.

The processor 640 may provide the user with the registration result associated with the security login service, which is received through the display circuit 610, through the screen.

The processor 640 may display the web page in the screen through the display circuit 610. The processor 640 may receive a user input for requesting a security login to the web page from the user through the user input circuit 620.

The processor 640 may receive the security login request from the web page through the communication circuit 630. The security login request may include transaction information that the web page receives from the web-server 540. The processor 640 may execute a security payment application, for example, a SAMSUNG PAY™ application based on the security login request.

The processor 640 may request the security login from the payment service provider server 520 through the display circuit 610. The security login request that is transmitted to the payment service provider server 520 may include an address of the web page and the transaction information.

The processor 640 may receive a request for authentication information from the payment service provider server 520 through the communication circuit 630. For example, the payment service provider server 520 may determine whether the user of the electronic device 510 subscribes the security login service of the web page. In the case where there is a history in which the security login service is subscribed in advance, the processor 640 may receive a request for authentication information from the payment service provider server 520 through the communication circuit 630.

The processor 640 may receive the authentication information from the user through the user input circuit 620. The authentication information may be, for example, biometric information such as a fingerprint, an iris, or the like and may be a password or the like that the user assigns in advance. The processor 640 may transmit the received authentication information to the payment service provider server 520 through the communication circuit 630.

The processor 640 may receive the authentication result associated with the authentication information from the payment service provider server 520 through the communication circuit 630 together with the security information, the transaction information, and the user account information.

The processor 640 may transmit the transaction information and the authentication result to the web page through the communication circuit 630.

The processor 640 may display a screen, in which the login to the web page is performed, through the display circuit 610.

The memory 650 may include an internal memory or an external memory. For example, the internal memory may include at least one of a volatile memory (e.g., a dynamic random access memory (DRAM), a static RAM (SRAM), or a synchronous DRAM (SDRAM)), a nonvolatile memory (e.g., a one-time programmable read only memory (OT-PROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like)), a hard disk drive (HDD), or a solid state drive (SSD).

The external memory may include a flash drive, for example, a compact flash (CF), a secure digital (SD), a micro-SD, a mini-SD, an extreme digital (xD), a multimedia card (MMC), or a memory stick, and the like. The external memory may be operatively and/or physically connected with the electronic device 510 through various interfaces.

It should be well understood to those skilled in the art that the display circuit 610, the user input circuit 620, the communication circuit 630, the processor 640, and the memory 650 are implemented independently of each other or two or more thereof are integrated.

Figure 7:
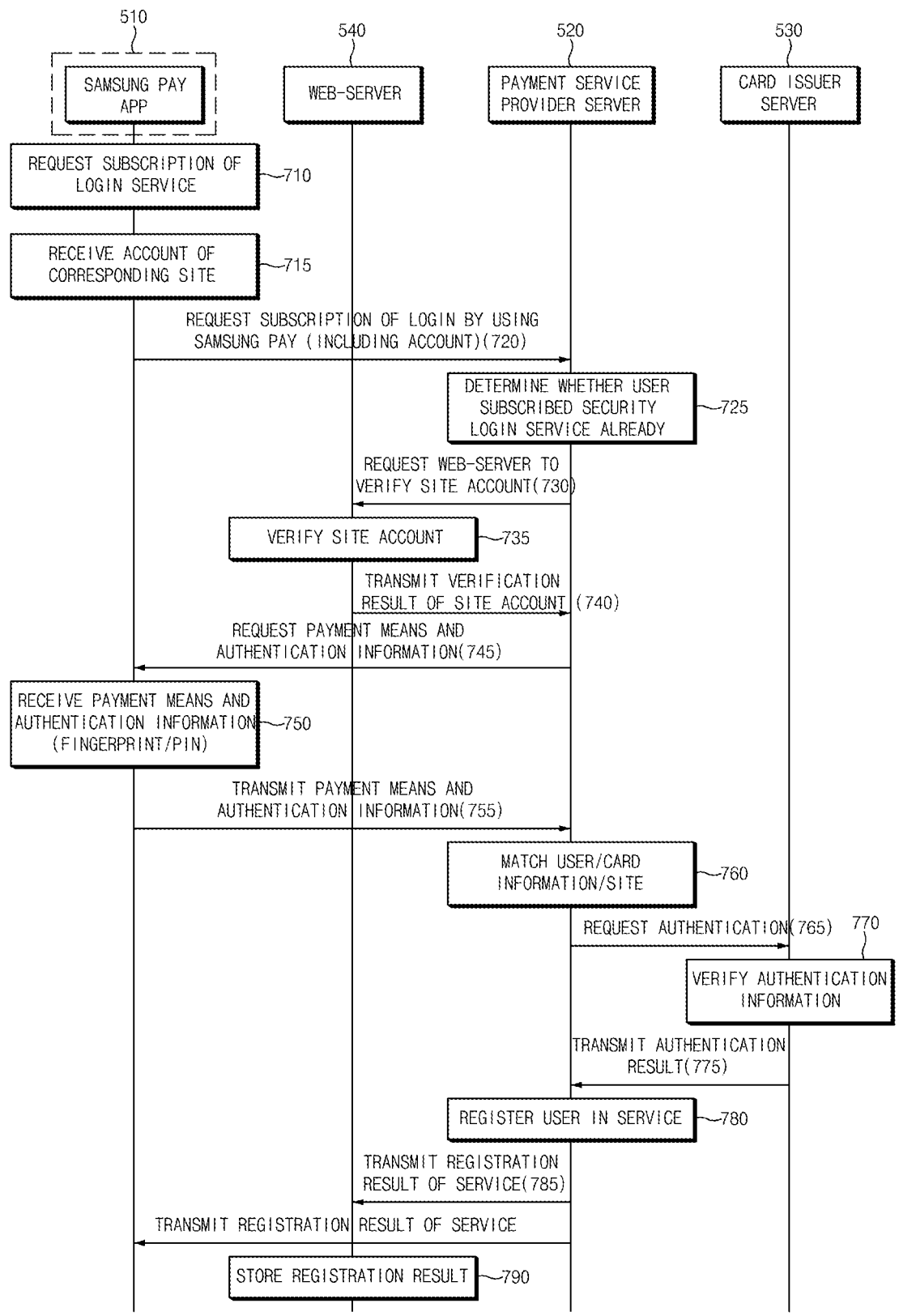
FIG. 7 illustrates a method for registering a user in a security login service, according to various embodiments of this disclosure.

FIG. 7 illustrates a method for registering a user in a security login service, according to various embodiments of this disclosure.

Referring to FIG. 7, the method for registering the user in the security login service according to various embodiments of this disclosure shown in FIG. 7 may include operations processed in time series in the electronic device 510, the payment service provider server 520, the card issuer server 530, and the web-server 540 according to various embodiments of this disclosure shown in FIGS. 1 to 6. Therefore, although there are omitted contents below, details about the electronic device 510, the payment service provider server 520, the card issuer server 530, and the web-server 540 of FIGS. 1 to 6 may be applied to the method for registering the user in the security login service according to various embodiments shown in FIG. 7.

In operation 710, the electronic device 510 may receive a user input for requesting the subscription of a security login service from a user.

In operation 715, the electronic device 510 may receive an account of a web page (e.g., a site), which is used for the security login service, from the user.

In operation 720, the electronic device 510 may transmit a subscription request for the security login service to the payment service provider server 520. The subscription request for the security login service may include, for example, a web page (a site (e.g., naver.com)), to which the security login service is provided, and user account information (e.g., an ID and a password) of the web page.

In operation 725, the payment service provider server 520 may check a subscription history of the user of the electronic device 510.

In operation 725, in the case where there is no subscription history, in operation 730, the payment service provider server 520 may request the web-server 540 operating the web page to verify the user account information.

In operation 735, the web-server 540 may receive the request for verifying the user account information. In operation 740, the web-server 540 may transmit the verification result of the user account information to the payment service provider server 520.

In operation 745, the payment service provider server 520 may verify the validity of the user account information to request the payment means and authentication information (e.g., a password, pin information, or biometric information) from the electronic device 510.

In operation 750, the electronic device 510 may provide a screen for requesting the payment means and the authentication information from the user, through a display. The electronic device 510 may receive the payment means and the authentication information from the user.

In operation 755, the electronic device 510 may transmit the received payment means and the requested authentication information to the payment service provider server 520.

In operation 760, the payment service provider server 520 may match information of the electronic device 510, the selected payment means information, web page information, and user account information with each other and may store the matched result.

In operation 765, the payment service provider server 520 may request authentication from the card issuer server 530. According to various embodiments of this disclosure, card issuers may operate different servers from each other, respectively. The card issuer server 530 may be a server that a card issuer corresponding to the selected payment means operates. For example, in the case where the user selects a samsung credit card as a payment means, the payment service provider server 520 may request the authentication from the server of the samsung credit card. The authentication request may include the payment means information and the authentication information.

In operation 770, the card issuer server 530 may perform the authentication through the payment means and the authentication information.

In operation 775, the card issuer server 530 may transmit the authentication result to the payment service provider server 520. According to various embodiments of this disclosure, the card issuer server 530 may match the information of the electronic device 510, the selected payment means information, the web page information, the user account information, and the authentication information with each other and may store the matched result.

In operation 780, the payment service provider server 520 may register the user of the electronic device 510 in the security login service based on the authentication result of the card issuer server 530.

In operation 785, the payment service provider server 520 may provide the registration result associated with the security login service of the user of the electronic device 510 to the electronic device 510 and the web-server 540.

In operation 790, the web-server 540 may store the received registration result. The electronic device 510 may provide the user with the received registration result through the display.

Figure 8:
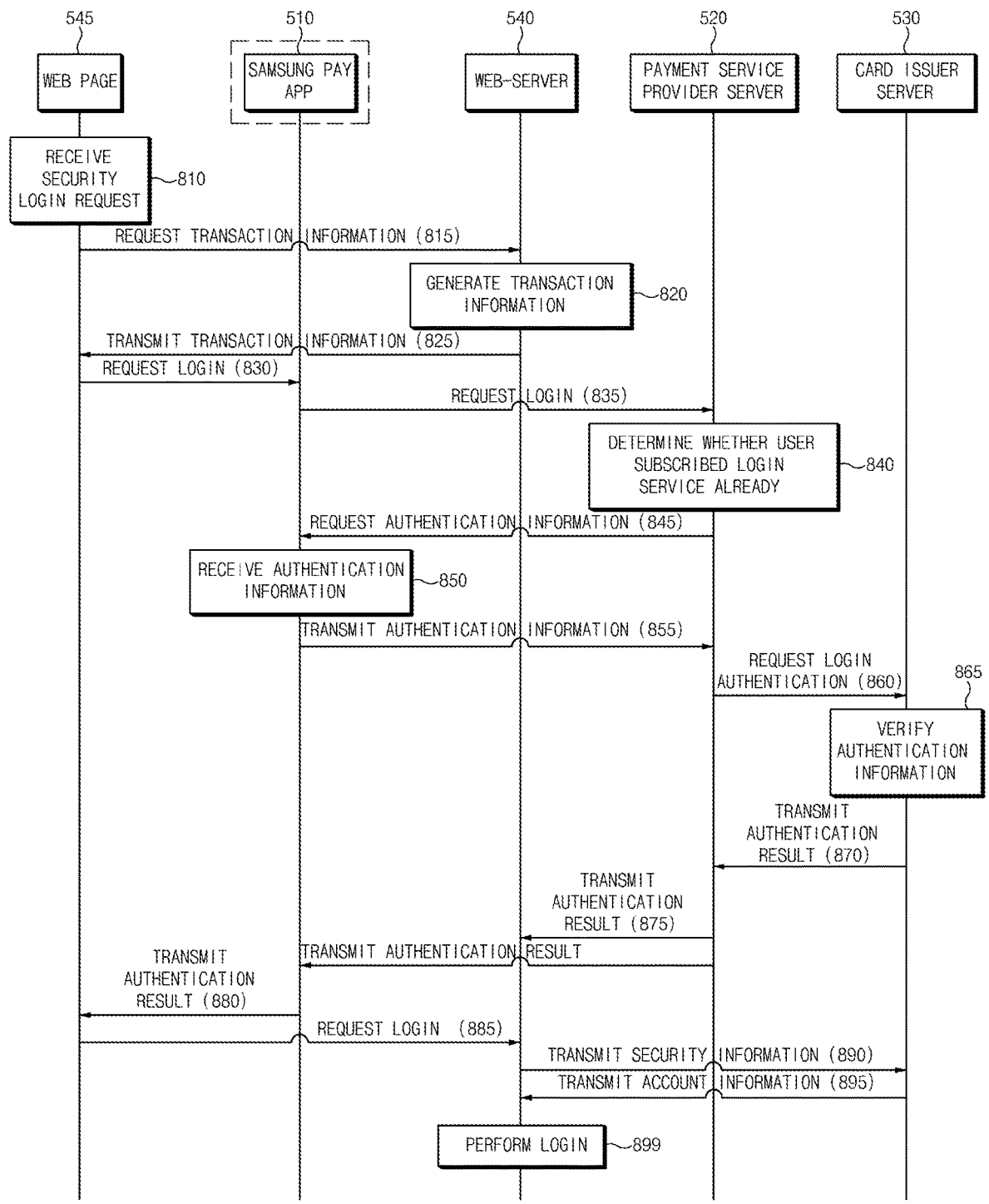
FIG. 8 illustrates a method for using a security login service, according to various embodiments of this disclosure.

FIG. 8 illustrates a method for using a security login service, according to various embodiments of this disclosure.

Referring to FIG. 8, the method for using the security login service according to various embodiments shown in FIG. 8 may include operations processed in time series in the electronic device 510, the payment service provider server 520, the card issuer server 530, the web-server 540, and the web page 545 according to various embodiments shown in FIGS. 1 to 6. Therefore, although there are omitted contents below, details about the electronic device 510, the payment service provider server 520, the card issuer server 530, the web-server 540, the web page 545 of FIGS. 1 to 6 may be applied to the method for using the security login service according to various embodiments shown in FIG. 8.

In operation 810, the web page 545 may receive a security login request. The security login may be requested in response to a user input received from a user.

In operation 815, the web page 545 may request transaction information from the web-server 540.

In operation 820, the web-server 540 may generate the transaction information as the response of the received request.

In operation 825, the web-server 540 may transmit the generated transaction information to the web page 545.

In operation 830, the web page 545 may transmit the login request to the electronic device 510. The login request transmitted to the electronic device 510 may include the received transaction information.

In operation 835, the electronic device 510 (e.g., a samsung pay application) may request the login from the payment service provider server 520. The login request that is transmitted to the payment service provider server 520 may include an address of the web page and the transaction information.

In operation 840, the payment service provider server 520 may determine whether the user of the electronic device 510 subscribes the security login service of the web page 545.

In the case where there is a history in which the security login service is subscribed in advance, in operation 845, the payment service provider server 520 may request authentication information from the electronic device 510.

In operation 850, the electronic device 510 may receive the authentication information from the user. The authentication information may be, for example, biometric information such as a fingerprint, an iris, or the like and may be a password or the like that the user assigns in advance.

In operation 855, the electronic device 510 may transmit the received authentication information to the payment service provider server 520.

In operation 860, the payment service provider server 520 may transmit a login authentication request including the received authentication information to the card issuer server 530.

In operation 865, the card issuer server 530 may compare authentication information, which is registered in the card issuer server 530 in advance, with authentication information received from the payment service provider server 520 to determine whether the authentication information received from the payment service provider server 520 is valid.

In operation 870, the card issuer server 530 may transmit the determined authentication result to the payment service provider server 520. If the authentication information is valid, the card issuer server 530 may generate security information (e.g., an OTC). Afterwards, the card issuer server 530 may transmit the authentication result to the payment service provider server 520. The authentication result may include the generated security information, and user account information corresponding to the web page 545.

In operation 875, the payment service provider server 520 may transmit the authentication result received from the card issuer server 530 and transaction information to the web-server 540 and the electronic device 510.

In operation 880, the electronic device 510 may transmit the transaction information and the authentication result to the web page 545.

In operation 885, the web page 545 may request a login by transmitting the transaction information to the web-server 540.

In operation 890, the web-server 540 may determine whether the transaction information received from the web page 545 is the same as transaction information generated by the web-server 540. In addition, the web-server 540 may allow the card issuer server 530 to verify the security information by transmitting the security information received from the payment service provider server 520 to the card issuer server 530.

In operation 895, the card issuer server 530 may transmit the user account information to the web-server 540.

In operation 899, the web-server 540 may perform the security login associated with the web page 545 based on the received user account information.

Figure 9:
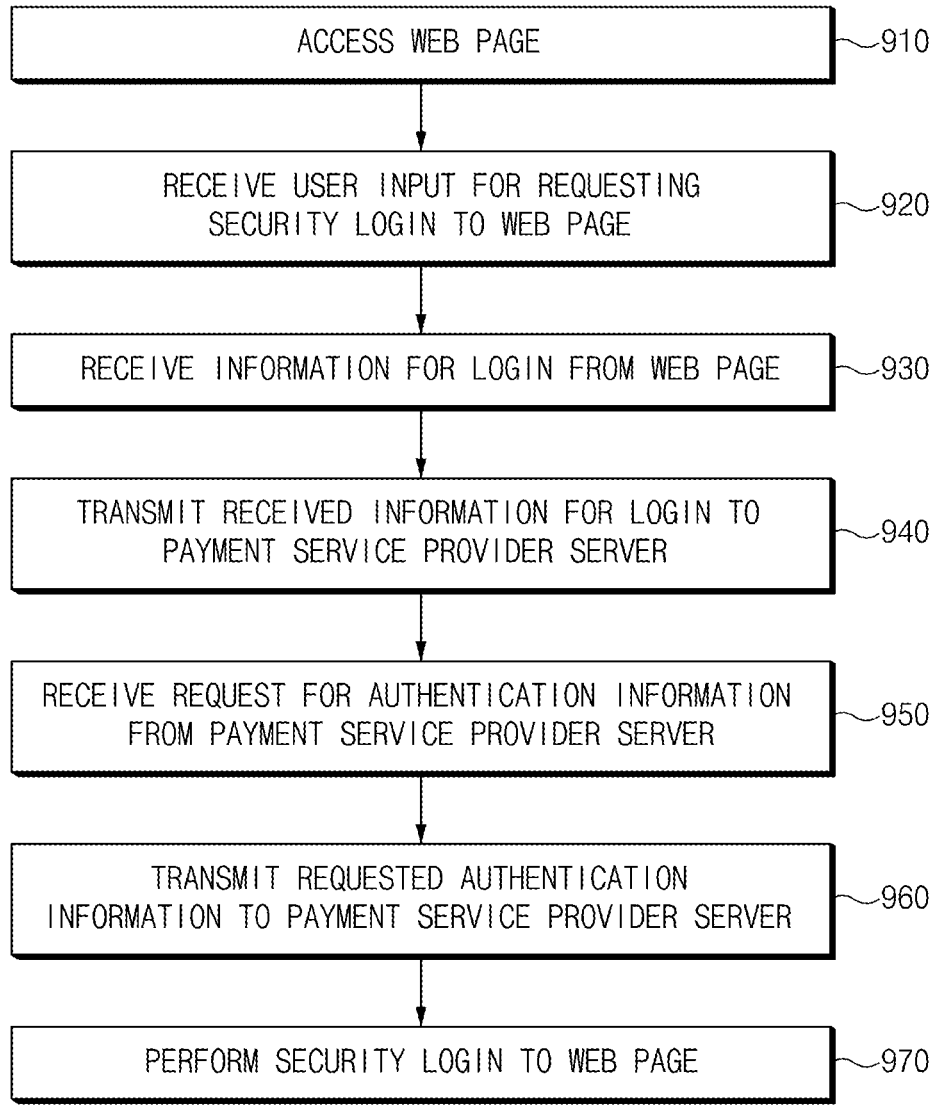
FIG. 9 illustrates a method for using a security login service, according to various embodiments of this disclosure.

FIG. 9 illustrates a method for using a security login service, according to various embodiments of this disclosure.

Referring to FIG. 9, the method for using the security login service according to various embodiments of this disclosure shown in FIG. 9 may include operations processed in time series in the electronic device 510, the payment service provider server 520, the card issuer server 530, and the web-server 540 according to various embodiments of this disclosure shown in FIGS. 1 to 8. Therefore, although there are omitted contents below, details about the electronic device 510, the payment service provider server 520, the card issuer server 530, and the web-server 540 of FIGS. 1 to 8 may be applied to the method for using the security login service according to various embodiments shown in FIG. 9.

In operation 910, the electronic device 510 may access the web page 545.

In operation 920, the electronic device 510 may receive a user input for requesting a security login to the web page 545.

In operation 930, the electronic device 510 may receive information for a login (first information for a login) from the web page 545. The information for the login (the first information) may be transaction information that is generated by the web-server 540 and transmitted to the web page 545.

In operation 940, the electronic device 510 may transmit the information for the login (the first information), which is received in operation 930, to the payment service provider server 520.

In operation 950, the electronic device 510 may receive a request for authentication information from the payment service provider server 520.

In operation 960, the electronic device 510 may receive the authentication information from a user and may transmit the received authentication information to the payment service provider server 520.

In operation 970, the electronic device 510 may perform a security login to the web page 545.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of this disclosure may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

According to various embodiments of this disclosure, the electronic device and the method may perform a login service by using a payment means and authentication information, which are stored in an electronic device in advance, for a security login service, thereby improving the usage convenience such that a user does not perform a new authentication process.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate as one or more software modules to perform an operation according to various embodiments, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:

transmitting, by an electronic device including a communication circuit and a processor, a first request for a subscription of a login service to provide access to a web page using a payment application which is installed on the electronic device to a payment service provider server associated with the payment application, wherein the first request includes user account information of a user to login the web page;

in response to an approval from the payment service provider server, receiving, by the electronic device, a payment means and authentication information from the user;

transmitting, by the electronic device, the payment means and the authentication information to the payment service provider server;

receiving, by the electronic device, a completion result of the subscription of the login service from the payment service provider server;

accessing, by the electronic device, the web page through the communication circuit;

receiving, by the electronic device, a user input selecting the login service to provide access to the web page;

receiving, by the electronic device, from a web-server associated with the web page, first information generated by the web-server for the login service based on the user input;

in response to receiving the first information, executing the payment application by the electronic device;

transmitting, by the electronic device, the first information, information identifying the electronic device, information of the payment means, and information of the web page to the payment service provider server;

receiving subscription information indicating whether the electronic device subscribes for the login service from the payment service provider server, wherein the subscription information is generated by the payment service provider server based on a matched results by matching information of the electronic device, the information of the payment means, the information of the web page, and the user account information;

in response to the subscription information indicating that the electronic device is subscribed for the login service, receiving, by the electronic device, a second request for the authentication information from the payment service provider server;

receiving, by the electronic device, the authentication information by using the payment application;

transmitting, by the electronic device, the authentication information received by the payment application to the payment service provider server;

in response to receiving authentication result for the authentication information from the payment service provider server, transmitting a third request to login with the first information to the web-server; and in response to transmitting the third request to login with the first information, accessing the web page.

2. The method of claim 1, wherein the first information includes transaction information generated by the web-server associated with the web page.

3. The method of claim 1, wherein the payment application transmits to the payment service provider server the first information and information for identifying the user that is associated with the web page.

4. The method of claim 1, further comprising:
receiving a second user input associated with the second request for the authentication information.

5. The method of claim 4, wherein the authentication information includes a password or biometric information.

6. The method of claim 4, further comprising:
transmitting, by the payment service provider server, the authentication information to a card issuer server.

7. The method of claim 1, further comprising:
registering at least two payment sources in the payment application depending on a domain of the web page.

8. The method of claim 7, further comprising:
matching the at least two payment sources based on the domain; and
registering the at least two payment sources that match.

9. The method of claim 1, further comprising:
receiving, from the payment service provider server, security information generated by a card issuer server; and
after receiving the security information from the payment service provider server, transmitting the security information to the card issuer server.

10. The method of claim 9, wherein the security information includes temporary card information.

11. An electronic device comprising:
a communication circuit;
a display circuit;
a user input circuit; and
a processor operably connected with the communication circuit, the display circuit, and the user input circuit, wherein the processor is configured to:
transmit a first request for a subscription of a login service to provide access to a web page using a payment application which is installed on the electronic device to a payment service provider server associated with the payment application, wherein the first request includes user account information of a user to login the web page;
in response to an approval from the payment service provider server, receive a payment means and authentication information from the user;
transmit the payment means and the authentication information to the payment service provider server;
receive a completion result of the subscription of the login service from the payment service provider server;
access the web page through the communication circuit;
display the web page in a screen through the display circuit;
receive a user input selecting the login service to provide access to the web page through the user input circuit;
receive, from a web-server associated with the web page, first information generated by the web-server for the login service through the communication circuit based on the user input;
in response to receiving the first information, execute the payment application;
transmit the first information, information identifying the electronic device, information of the payment means, and information of the web page to the payment service provider server;
receive subscription information indicating whether the electronic device subscribes for the login service from the payment service provider server, wherein the subscription information is generated by the payment service provider server based on a matched results by matching information of the electronic device, the information of the payment means, the information of the web page, and the user account information;
in response to the subscription information indicating that the electronic device is subscribed for the login service, receive a second request for the authentication information from the payment service provider server;
receive the authentication information by using the payment application;
transmit the authentication information received by the payment application to the payment service provider server;
in response to receiving authentication result for the authentication information from the payment service provider server, transmit a third request to login with the first information to the web-server; and
in response to transmitting the third request to login with the first information, access the web page.

12. The electronic device of claim 11, wherein the first information includes transaction information generated by the web-server associated with the web page.

13. The electronic device of claim 11, wherein the processor is configured to:
receive a second user input associated with the second request for the authentication information through the user input circuit.

14. The electronic device of claim 13, wherein the authentication information includes a password or biometric information.

15. The electronic device of claim 13, wherein the processor is configured to:
transmit the authentication information to a card issuer server.

16. The electronic device of claim 11, wherein the processor is configured to:
receive, from the payment service provider server, security information generated by a card issuer server, by using the communication circuit; and
after receiving the security information from the payment service provider server, transmit the security information to the card issuer server.

* * * * *